US012756088B2

(12) United States Patent
Vakil et al.

(10) Patent No.: US 12,756,088 B2
(45) Date of Patent: Oct. 6, 2026

(54) LOW-COST MINIATURIZED VERTICAL COAXIAL CABLE TO PCB TRANSITION FOR USE IN ULTRA-DENSE BASE STATION ANTENNAS

(71) Applicant: John Mezzalingua Associates, LLC, Liverpool, NY (US)

(72) Inventors: Zankar Vakil, Camillus, NY (US); Evan Wayton, Tully, NY (US); Anoop Tiwari, Liverpool, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 319 days.

(21) Appl. No.: 18/562,486

(22) PCT Filed: May 20, 2022

(86) PCT No.: PCT/US2022/030244

§ 371 (c)(1),
(2) Date: Nov. 20, 2023

(87) PCT Pub. No.: WO2022/246192

PCT Pub. Date: Nov. 24, 2022

(65) Prior Publication Data

US 2024/0304983 A1 Sep. 12, 2024

Related U.S. Application Data

(60) Provisional application No. 63/191,016, filed on May 20, 2021.

(51) Int. Cl.
*H01Q 1/24* (2006.01)

(52) U.S. Cl.
CPC .................................. *H01Q 1/246* (2013.01)

(58) Field of Classification Search
CPC ...... H01Q 1/246; H01Q 13/203; H01P 5/085; H01R 9/0515; H01R 12/53; H01R 2103/00; H01R 2201/02
See application file for complete search history.

(56) References Cited

U.S. PATENT DOCUMENTS 3,910,665 A 10/1975 Stull
6,628,182 B1 9/2003 Oldfield
(Continued)

FOREIGN PATENT DOCUMENTS

KR 20110008322 U 8/2011
KR 20-0455921 Y1 10/2011
(Continued)

OTHER PUBLICATIONS

International Search Report, dated Sep. 13, 2022, received in connection with corresponding International Patent Application No. PCT/US2022/030244.
(Continued)

*Primary Examiner* — Daniel Munoz
(74) *Attorney, Agent, or Firm* — Meunier Carlin & Curfman LLC

(57) ABSTRACT

Disclosed is a vertical RF launch mechanism for installing an RF cable onto an antenna PCB. The mechanism includes a cutout formed in the PCB whereby the cutout has interlocking tabs and an inner conductor receptacle formed in one interior edge. Installed on this interior edge is a vertical clip that has two tabs and a cylindrical outer conductor receptacle. The design of the cutout and the clip allows an RF cable to be installed so that it is vertically mounted to the PCB, provides a high-quality coupling for both the inner and outer conductors of the RF cables. It enables the soldering for both the inner and outer conductors to be done from the same side of the PCB. It also provides for a smaller cutout relative to conventional RF PCB launches, enabling a higher
(Continued)

density placement of RF cable launches on a given PCB, providing for ultra-dense antenna designs.

5 Claims, 12 Drawing Sheets

(56) References Cited

U.S. PATENT DOCUMENTS

| | | | | |
|---|---|---|---|---|
| 8,192,209 | B1 * | 6/2012 | Li | H01R 13/6591<br>174/40 R |
| 8,932,078 | B1 * | 1/2015 | Martin | H01R 24/50<br>439/574 |

FOREIGN PATENT DOCUMENTS

| | | | |
|---|---|---|---|
| KR | 20-0457150 | Y1 | 12/2011 |
| KR | 10-2021-0017719 | A | 2/2021 |
| WO | 2016104586 | A1 | 6/2016 |

OTHER PUBLICATIONS

Extended European Search Report, dated Mar. 21, 2025, received in connection with corresponding EP Patent Application No. 22805570.3.

* cited by examiner

LOW-COST MINIATURIZED VERTICAL COAXIAL CABLE TO PCB TRANSITION FOR USE IN ULTRA-DENSE BASE STATION ANTENNAS

CROSS REFERENCE TO RELATED APPLICATIONS

The application is a U.S. National Stage application filed under 35 U.S.C. § 371 of PCT/US2022/030244, filed on May 20, 2022, which claims the benefit of U.S. provisional application Ser. No. 63/191,016, filed on May 20, 2021.

BACKGROUND OF THE INVENTION

Field of the Invention

The present invention relates to wireless communications, and more particularly, to ultra-dense multiport base station antennas.

Related Art

The wireless industry has demanded an increasing number of dual-polarized antenna arrays within a fixed volume for up and coming macro and small cell base station antennas (BSAs) in the sub-6 GHz frequency domain. Each dual-polarized wide band antenna array within the BSA requires printed circuit boards (PCBs), and RF power dividers to achieve the required amplitude and phase distribution across the aperture of each array. Most often, these PCBs are connected using coaxial cables and RF transition clips which are designed to allow for the transition between the coaxial cable transmission line and the PCB transmission line while maintaining optimal VSWR, insertion loss.

FIG. 1 illustrates a PCB 100 on which are disposed different exemplary launch cutouts 110, 115, 120, and 125. Launch cutouts 110, 120, and 125 are of a conventional variety and designed to accommodate conventional PCB transition clips. Conventional horizontal transition clips 110, 120, and 125 result in large cutouts in the PCBs to provide ample room for strain relief of the coaxial cable (not shown). Conventional launch cutouts 110 and 125 correspond to conventional transition clips designed for transitions from behind the PCB to above the PCB; and conventional launch cutout 120 corresponds to a conventional transition clip whereby the coaxial cable remains on top of the PCB. It is readily apparent that conventional launch cutouts 110, 120, and 125 consume a large area of the PCB. If the cable is on the same side as the RF transmission line, the ground of the coaxial cable rests on the surface of the PCB which then becomes a "keep out zone" for transmission lines on the PCB, since they would couple to the coaxial cable outer jacket. These large cutouts are not conducive to the next generation of ultra-dense BSAs, as they take up precious space which needs to be used for the PCB feed network and power divider transmission lines.

Existing solutions to launching from coaxial cable to PCB fall under two categories, namely horizontal launches, and vertical launches. A conventional approach involves soldering the outer jacked of the coaxial cable directly to the ground plane of the back of the PCB and then soldering the center conductor of the coaxial cable to a PCB circuit trace or passing it through a non-plated drill hole in the PCB to be soldered to a PCB transmission line on the top side of the PCB. In this case, the ground solder joint is hidden once the antenna is assembled, therefore if any re-work needs to take place or if a faulty component needs to be replaced the PCB cannot be removed due to the inability to access the solder joint that bonds the coaxial cable outer jacket to the back of the PCB. This is serious problem in cylindrical small cell antennas in which any solder joint that resides on the back of the PCB will be concealed from view and is not accessible due to the nature of the cylindrical array structure.

Another approach is for the coaxial cable to pass from underneath the PCB to above the PCB co-planar/tangent to the PCB surface. As the thickness of the PCB increases, the required length of the cutout increases in order to maintain the same amount of strain relief and the bend radius on the coaxial cable to prevent stresses on the solder joint/PCB interface at the center conductor. This becomes unrealizable when using multi-layer boards just due to the length of the cutout required. Even for thin PCBs which are 0.030", the length and width of the cutout required can at times be too large to be able to still fit all the required RF circuitry within a specified area.

Conventional vertical clip launches suffer from the following deficiencies. One approach involves creating a non-plated through hole in the PCB for which the center conductor of the coaxial passes vertically through, perpendicular to the plane of the PCB. In this vertical launch technique, the ground of the PCB is soldered to the outer conductor of the coaxial cable behind the PCB. Given that the PCB is most often mounted to a large metallic plane, known as a reflector, this solder joint is not accessible. Therefore, if the PCB needs to be removed for any reason the ground solder joint must first be reflowed from the back of the PCB. While in some panel/macro BSAs access to the solder joint from the back may be possible, it is not possible in cylindrical small cell BSAs. Therefore, this technique does not provide for a viable manufacturing solution.

Other conventional solutions, such as PSMP interfaces allow solderless transitions to take place from coaxial cable to PCB in which the ground contact of the coaxial cable and the center conductor are made through a matching mating interface without solder. The connection is held in place through interference and is found in smooth bore and limited/full detent offerings. Although the RF performance of these connectors is favorable, the cost is prohibitive in most applications. Due to the high number of transitions required and the high piece part price of this approach, it is not a cost-effective solution for a solution to the problem for BSA transitions.

Accordingly, there is a need for a low-cost vertical clip launch solution that allows both the outer and inner conductor of an RF cable to be soldered from an accessible side of the PCB, provides for a minimal cutout size, and allows for multilayer PCBs.

SUMMARY OF THE DISCLOSURE

Accordingly, the present invention is directed to a miniaturized vertical coaxial cable to PCB transition that obviates one or more of the problems due to limitations and disadvantages of the related art.

An aspect of the disclosure involves an antenna having one or more PCBs (Printed Circuit Boards). Each of the one or more PCBs comprises a plurality of cutouts formed in the PCB, each of the plurality of cutouts having a pair of interlocking slots an inner conductor recess, and a solder pad disposed proximate to the inner conductor recess, wherein the solder pad is electrically coupled to an RF trace disposed on the PCB; a plurality of vertical clips, each corresponding to one of the plurality of cutouts, wherein each vertical clip is installed on an interior edge of its corresponding cutout, the vertical clip having a clip body, a cylindrical outer conductor receptacle, and a pair of mounting tabs, wherein the pair of mounting tabs engage with the pair of interlocking slots; and a plurality of RF cables, each of the plurality of RF cables mechanically coupled to a corresponding vertical clip and corresponding cutout, wherein each RF cable has an inner conductor that is soldered to a corresponding solder pad, and each RF cable has an outer conductor that is soldered to a corresponding cylindrical outer receptacle.

Another aspect of the present disclosure involves a method for installing a vertical RF launch on an antenna PCB (Printed Circuit Board), the PCB having a plurality of cutouts, each cutout having an inner conductor recess. The method comprises attaching a vertical clip onto an interior edge of each cutout; inserting an RF cable into each of the plurality of vertical clips from a first side of the PCB, wherein the inserting includes inserting an inner conductor of the RF cable through a corresponding inner conductor recess, and inserting an outer conductor of the RF cable into a cylindrical outer receptacle of the corresponding vertical clip; soldering, from a second side of the PCB, each inner conductor to a corresponding solder pad formed on a second side of the PCB; and soldering, from the second side of the PCB, each outer conductor to the corresponding cylindrical outer receptacle.

BRIEF DESCRIPTION OF THE DRAWINGS

The accompanying figures, which are incorporated herein and form part of the specification, illustrate a miniaturized vertical coaxial cable to PCB transition. Together with the description, the figures further serve to explain the principles of the miniaturized vertical coaxial cable to PCB transition described herein and thereby enable a person skilled in the pertinent art to make and use the miniaturized vertical coaxial cable to PCB transition.

DESCRIPTION OF EXEMPLARY EMBODIMENTS

The proposed solution greatly reduces the cutout required in the PCB to transition from coaxial cable to PCB, while maintaining superior RF performance, using a novel transition clip which accommodates a vertical RF launch in which the coaxial cable interfaces with the PCB perpendicular to the plane of the PCB. The proposed solution allows accessibility to the ground solder joint which grounds the outer conductor of the coaxial cable to the transition clip and PCB, while also keeping the solder joint which joins the center conductor of the coaxial cable to the circuit trace on the PCB accessible as well. Accessibility is a key benefit of the proposed solution over other vertical launch methods, which require the outer jacket of the coaxial cable to be soldered to the transition clip and PCB ground, behind the PCB, thereby rending that solder joint inaccessible for re-work purposes. The proposed method allows easy access to all solder joints which makes re-work possible and thereby greatly improves the manufacturability of the BSA.

The proposed solution is lower cost than using PSMP style vertical transition blocks. The solution offers improved manufacturability due the accessibility of solder joints. The solution frees up more real estate for RF splitter networks than horizontal transitions. This technique can achieve −30 dB return loss through 6 GHz, so it is just as broad band as other techniques.

Figure 1:
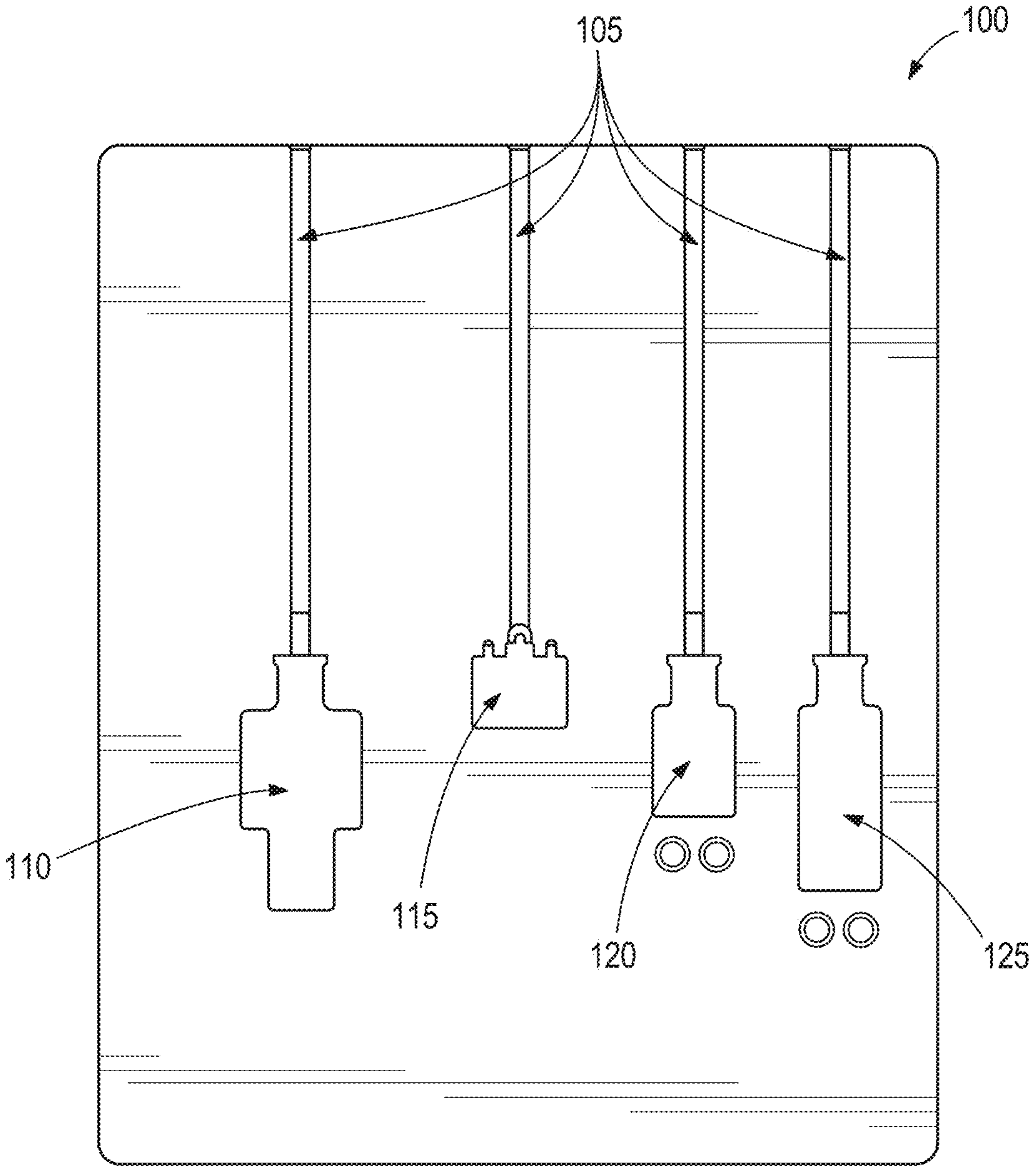
FIG. 1 illustrates a PCB having four transition cutouts, of which three are of conventional design and one corresponds to an exemplary transition clip according to the disclosure.
Figure 2:
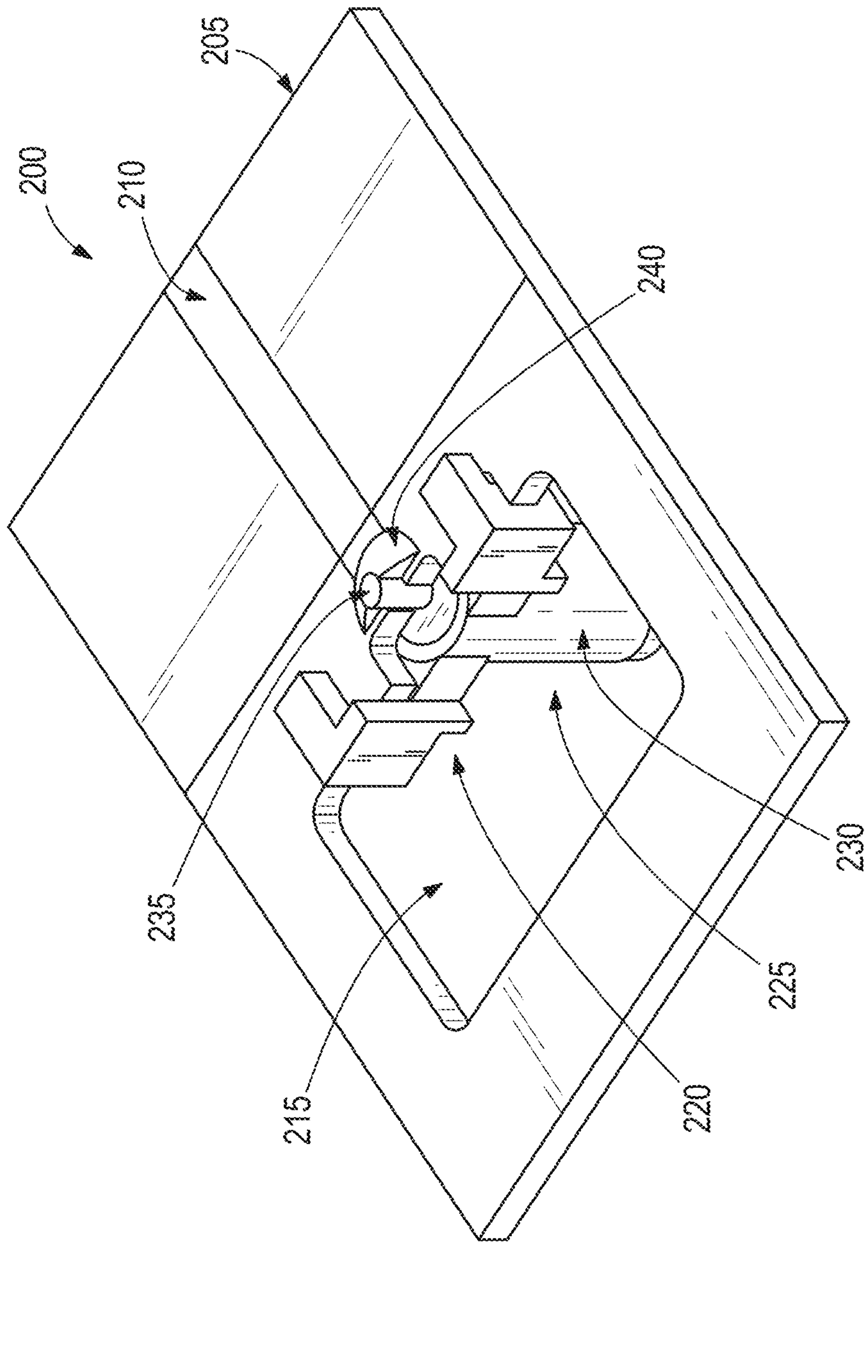
FIG. 2 illustrates the topside of a PCB with an exemplary vertical clip launch and installed RF cable according to the disclosure.

FIG. 2 illustrates an exemplary vertical RF launch installation 200 of the present disclosure, including a PCB 205 on which is disposed an RF trace 210. As illustrated, the PCB 205 is illustrated from its topside. Disposed in PCB 205 is a cutout 215 on which is installed an exemplary vertical clip 220. The vertical clip 220 is installed on an interior edge of the cutout 215. Installed on vertical clip 220 is an RF cable 225 having an outer conductor 230 that is soldered to vertical clip 220, and an inner conductor 235 that is electrically coupled to RF trace 210 via solder point 240.

As is apparent from FIG. 2, outer conductor 230 may be soldered to vertical clip 220 and inner conductor 235 may be soldered to solder point 240 from the topside of PCB 205.

Figure 3:
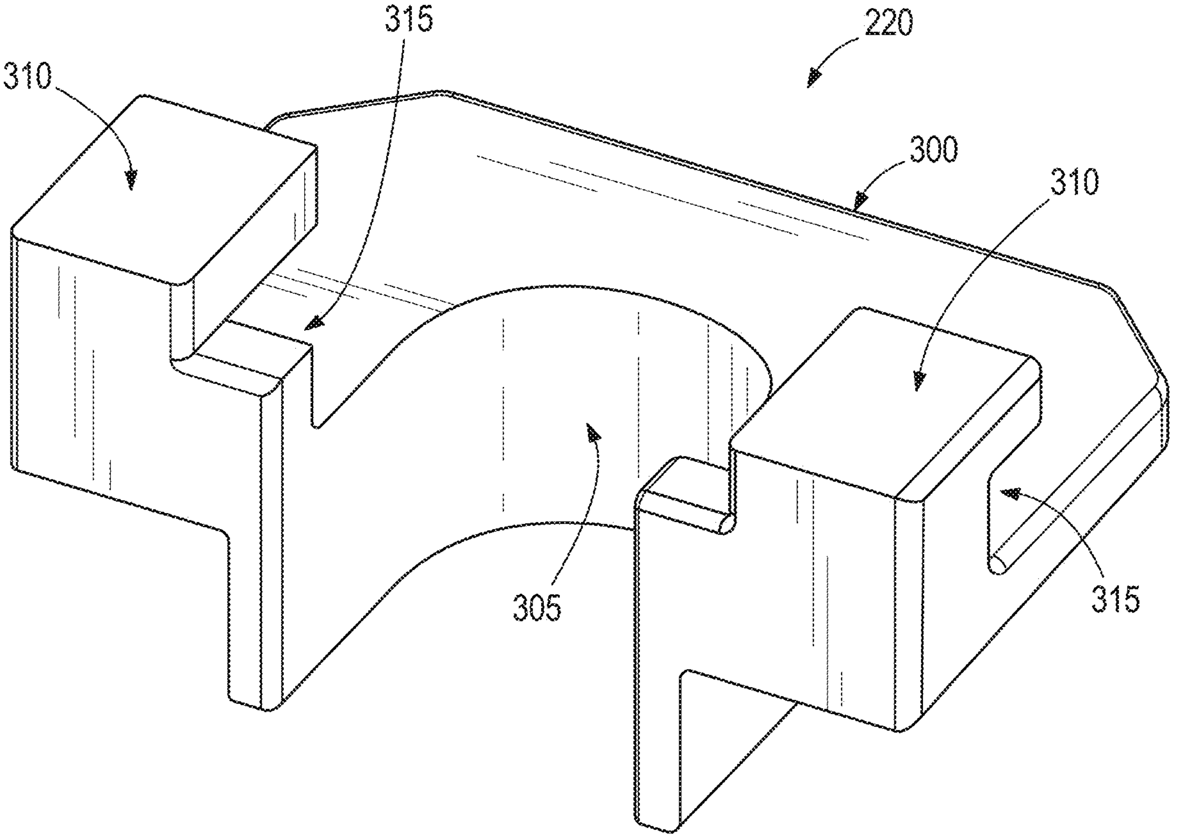
FIG. 3 illustrates an exemplary vertical clip according to the disclosure.

FIG. 3 illustrates an exemplary vertical clip 220 according to the disclosure. Vertical clip 220 includes a clip body 300; a cylindrical outer conductor receptacle 305; and two mounting tabs 310 that are used to grip PCB 205 along with clip body 300 such that the PCB 205 is inserted into a gap 315 disposed between clip body 300 and mounting tabs 310. Vertical clip 220 may be diecast for inexpensive and easy manufacture.

Figure 4A:
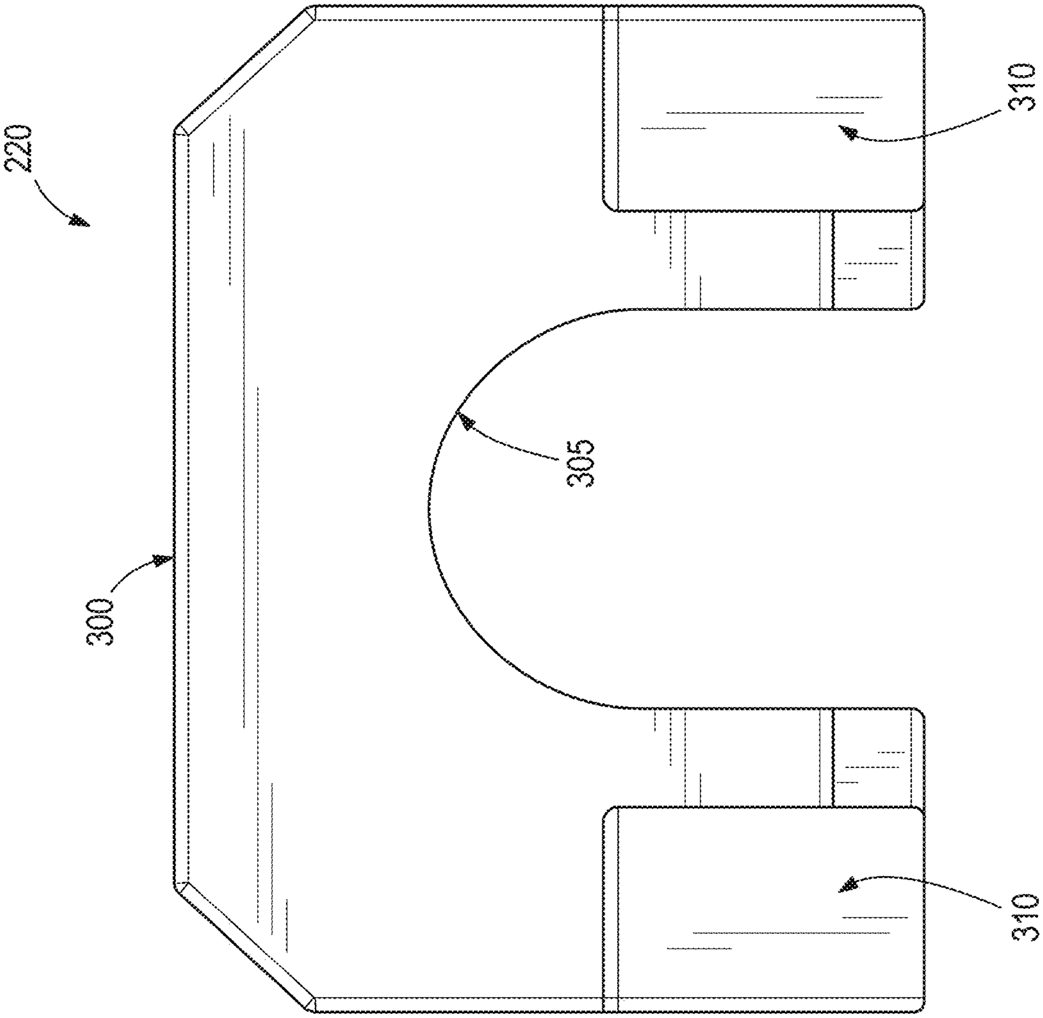
FIG. 4A is a top-down view of an exemplary clip according to the disclosure.
Figure 4B:
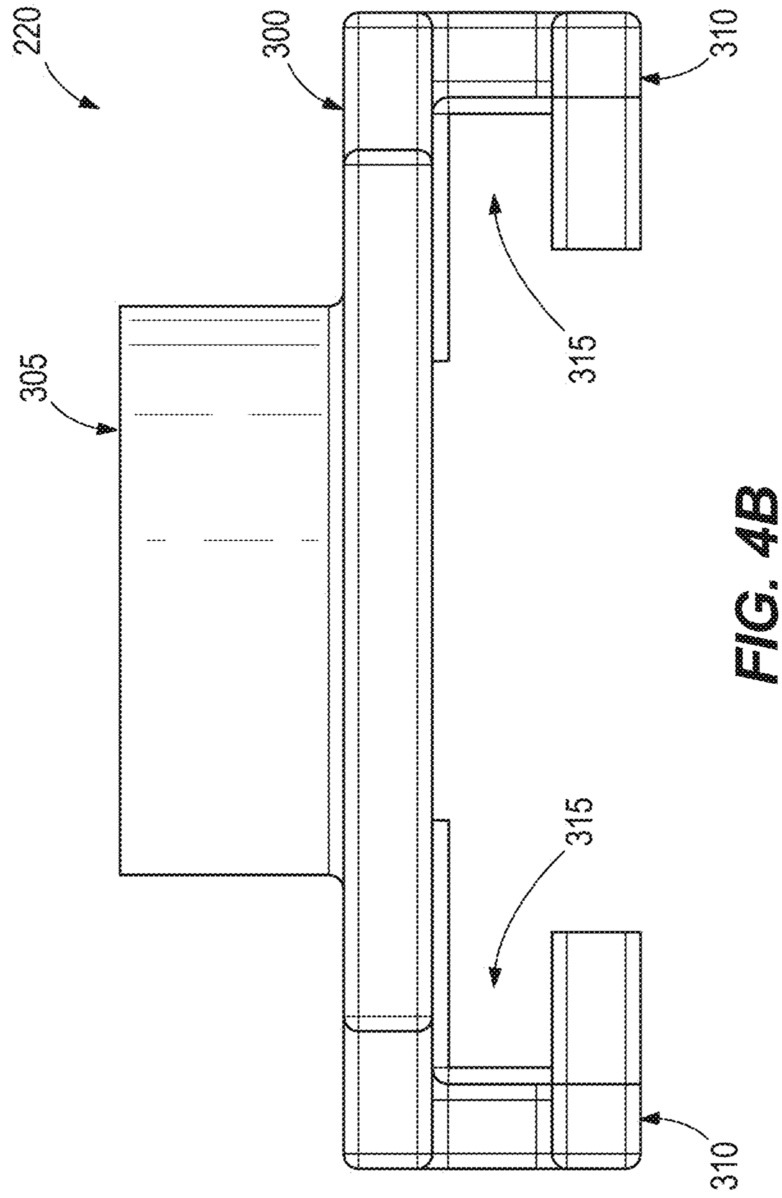
FIG. 4B is a side view of an exemplary clip according to the disclosure.
Figure 4C:
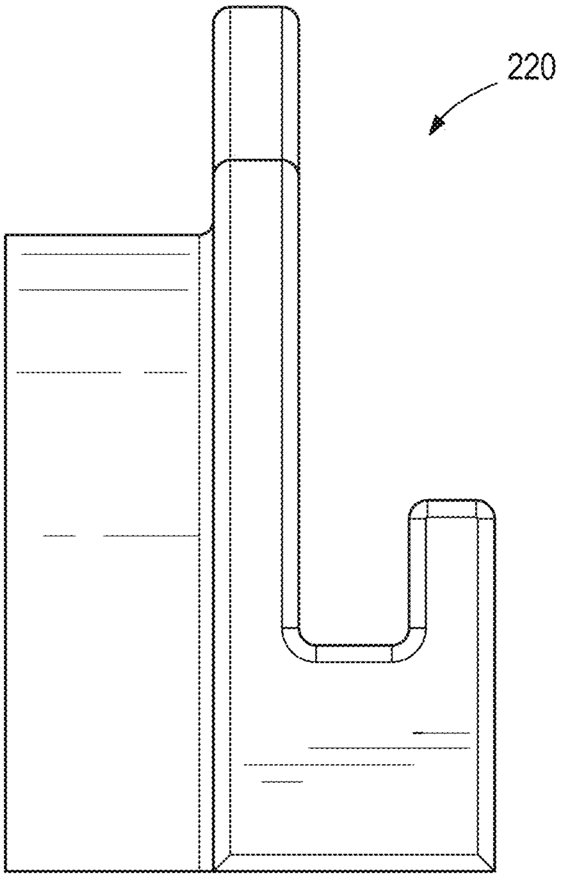
FIG. 4C is another side view of an exemplary clip according to the disclosure.

FIGS. 4A, 4B, and 4C are views of vertical clip 220 from the top and two orthogonal sides.

Figure 5:
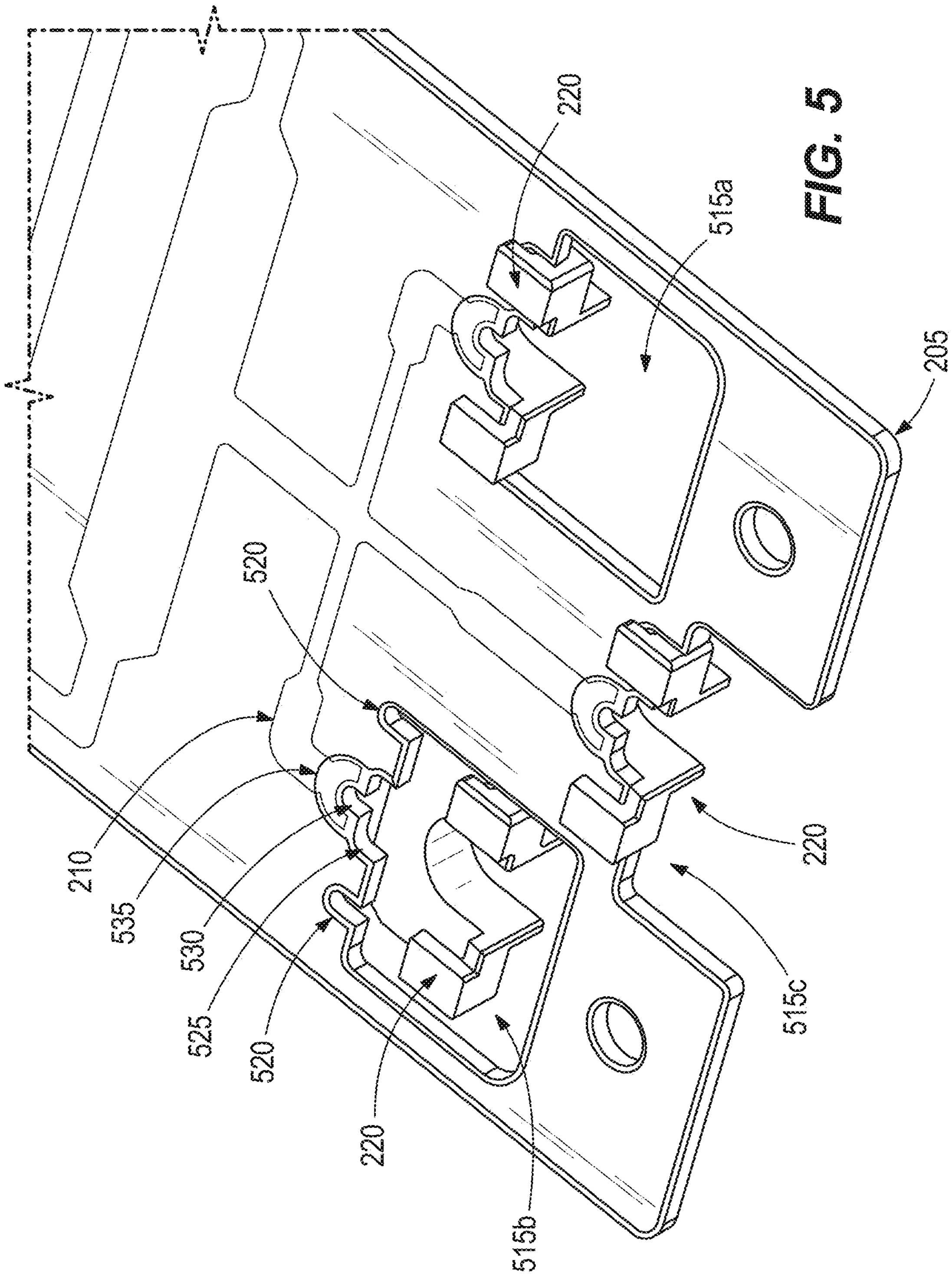
FIG. 5 illustrates three exemplary clips, one installed on an interior cutout, another being installed on an interior cutout, and one installed on an edge mount cutout.

FIG. 5 illustrates three exemplary vertical clips 220, one installed on an interior cutout 515*a*, another vertical clip 220 being installed on an interior cutout 515*b*, and another vertical clip 220 installed on an edge mount cutout 515*c*. As illustrated in FIG. 5, each interior cutout 515*a/b* and edge mount cutout 515*c* has a pair of interlocking slots 520 which engages corresponding vertical clip 220, thereby centering the vertical clip 220 and preventing its lateral motion. Each cutout 515*a/b/c* also has a center slot 525 on which is disposed an inner conductor recess 530, through which an inner conductor (not shown) is inserted so that it can be soldered to solder pad 535, by which the inner conductor becomes electrically coupled to RF trace 210. In doing so, solder is applied to the inner conductor and solder pad 535 to form solder point 240 illustrated in FIG. 2.

Figure 6:
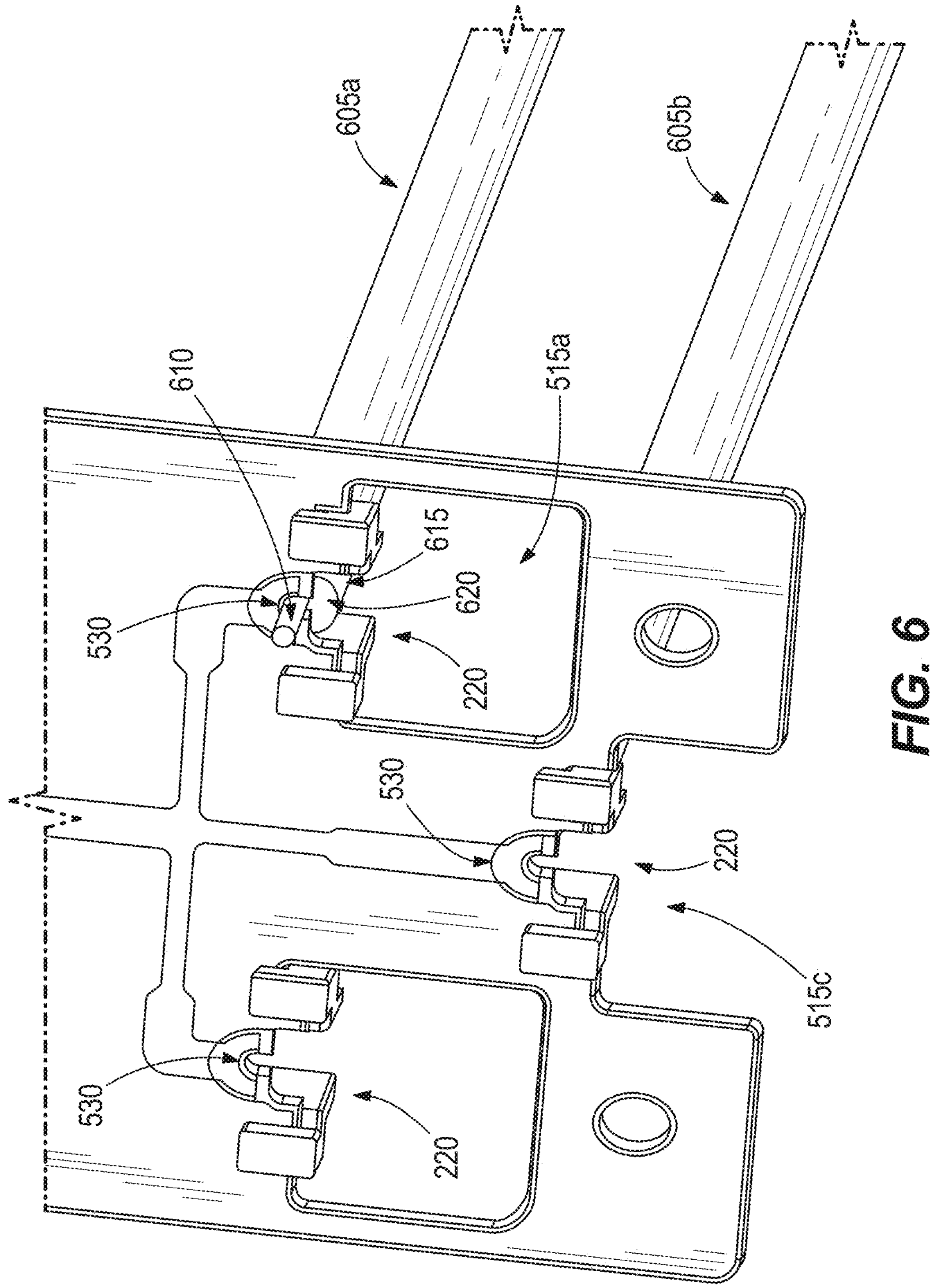
FIG. 6 illustrates the clips installed on the PCB from FIG. 5, further illustrating an RF cable being installed.

FIG. 6 illustrates the vertical clips 220 installed on the PCB 205 illustrated in FIG. 5, showing a first RF cable 605*a* into the vertical clip 220 disposed in cutout 515*a*, and a second RF cable 605*b* about to be inserted into the vertical clip 220 disposed in edge mount cutout 515*c*. As illustrated, the inner conductor 610 of first RF cable 605*a* is inserted into inner conductor recess 530 of vertical clip 220, and outer conductor 615 of first cable 605*a* is inserted into outer conductor receptacle 305 of the same vertical clip 220. FIG. 6 does not offer a perspective to show the pending insertion of second RF cable 605*b*.

Figure 7:
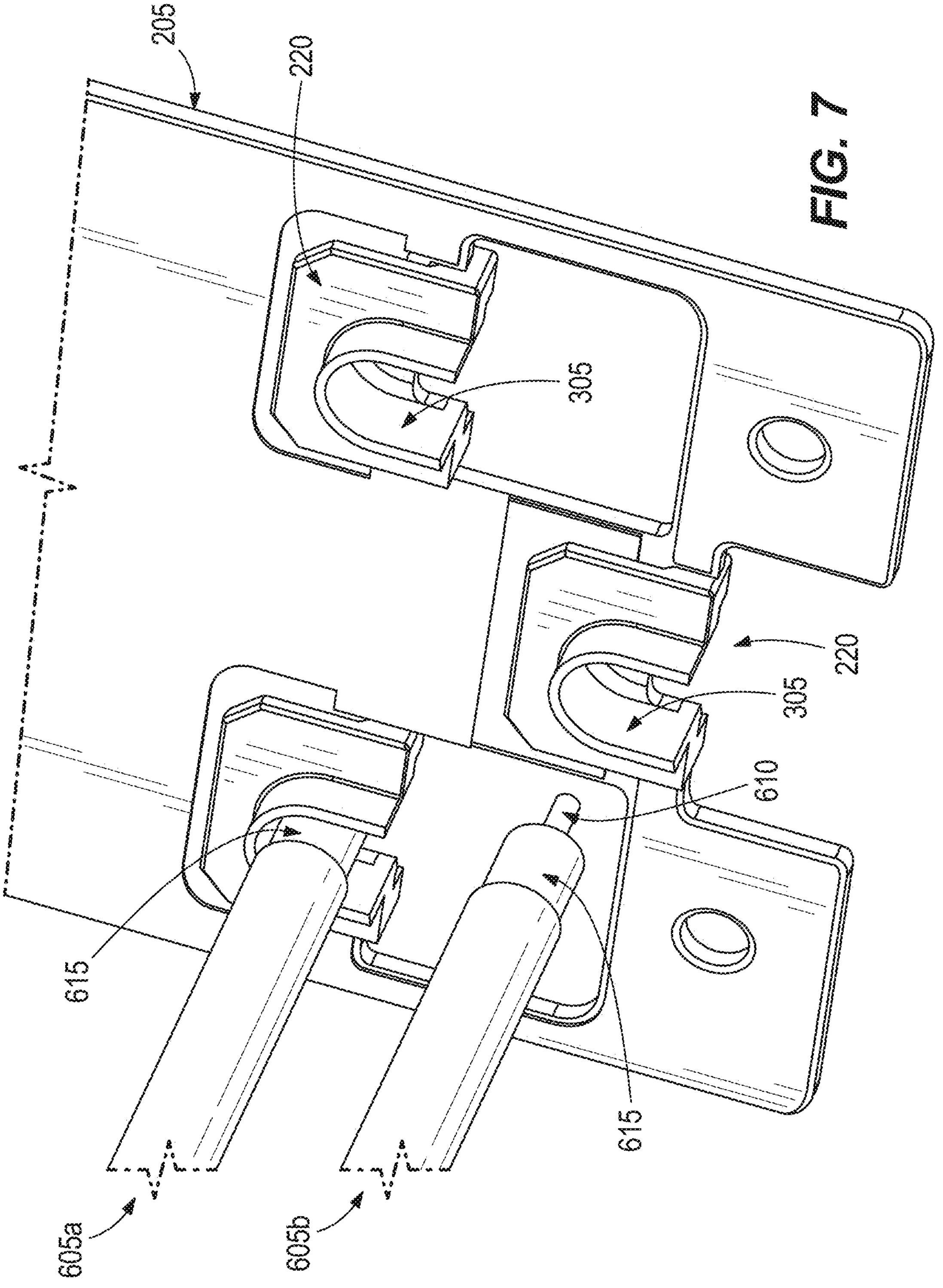
FIG. 7 illustrates an RF cable installed on a clip, and another RF cable in the process of being installed on another clip, as viewed from the underside of the PCB.

FIG. 7 is another perspective of FIG. 6, showing first RF cable 605*a* installed in its corresponding vertical clip 220, and second RF cable 605*b* pending insertion into its corresponding vertical clip 220.

Figure 8:
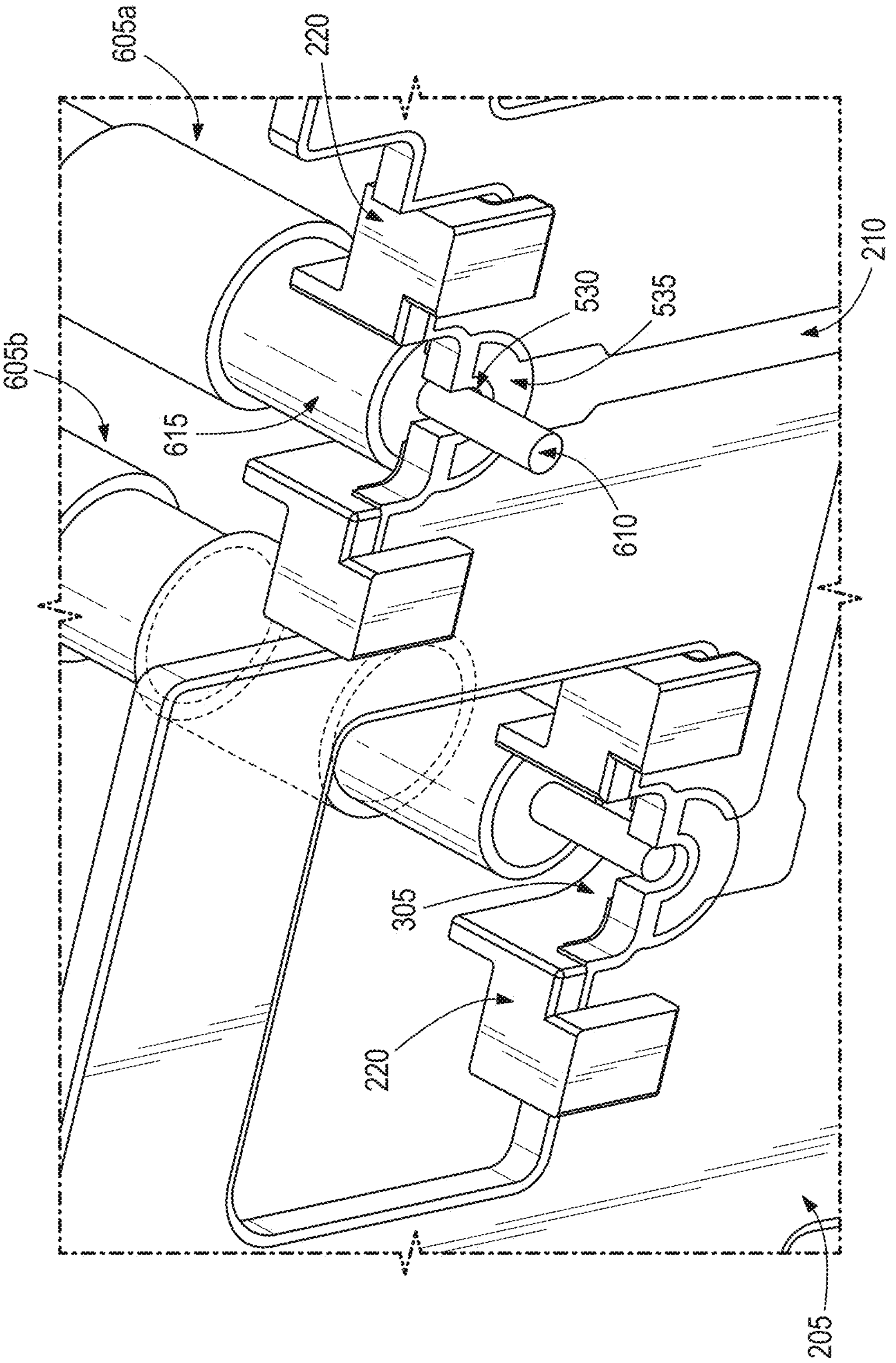
FIG. 8 illustrates the initial coupling of the inner and outer conductors of the RF cables 605 to their respective vertical clips 220.

FIG. 8 illustrates the initial coupling of the inner and outer conductors of the RF cables 605 to their respective vertical clips 220. As illustrated, first RF cable 605*a* is fully inserted into corresponding vertical clip 220, whereby the inner conductor 610 of first RF cable 605*a* is disposed in corresponding inner conductor recess 530, and the outer conductor 615 of first RF cable 605*a* is mechanically and electrically coupled to corresponding outer conductor receptacle 305. Once the first RF cable 605*a* is installed as illustrated, the connection may be completed by soldering whereby a solder may be applied to inner conductor 610 and solder pad 535 to form a solder joint 240 (not shown in FIG. 8). Although not shown, it will be understood that the solder joint 240 may be formed by soldering at the side of the PCB shown in FIG. 8. Additionally, a subsequent solder joint (not shown) may be formed by soldering the outer conductor 615 to the corresponding outer conductor receptacle 305. This outer conductor soldering may be performed by approaching the solder point from the same side of the PCB as the inner conductor solder joint 240 and inserting the solder tool through the cutout formed in the PCB. Accordingly, both inner and outer conductors may be soldered with easy access from the same side of the PCB.

Figure 9:
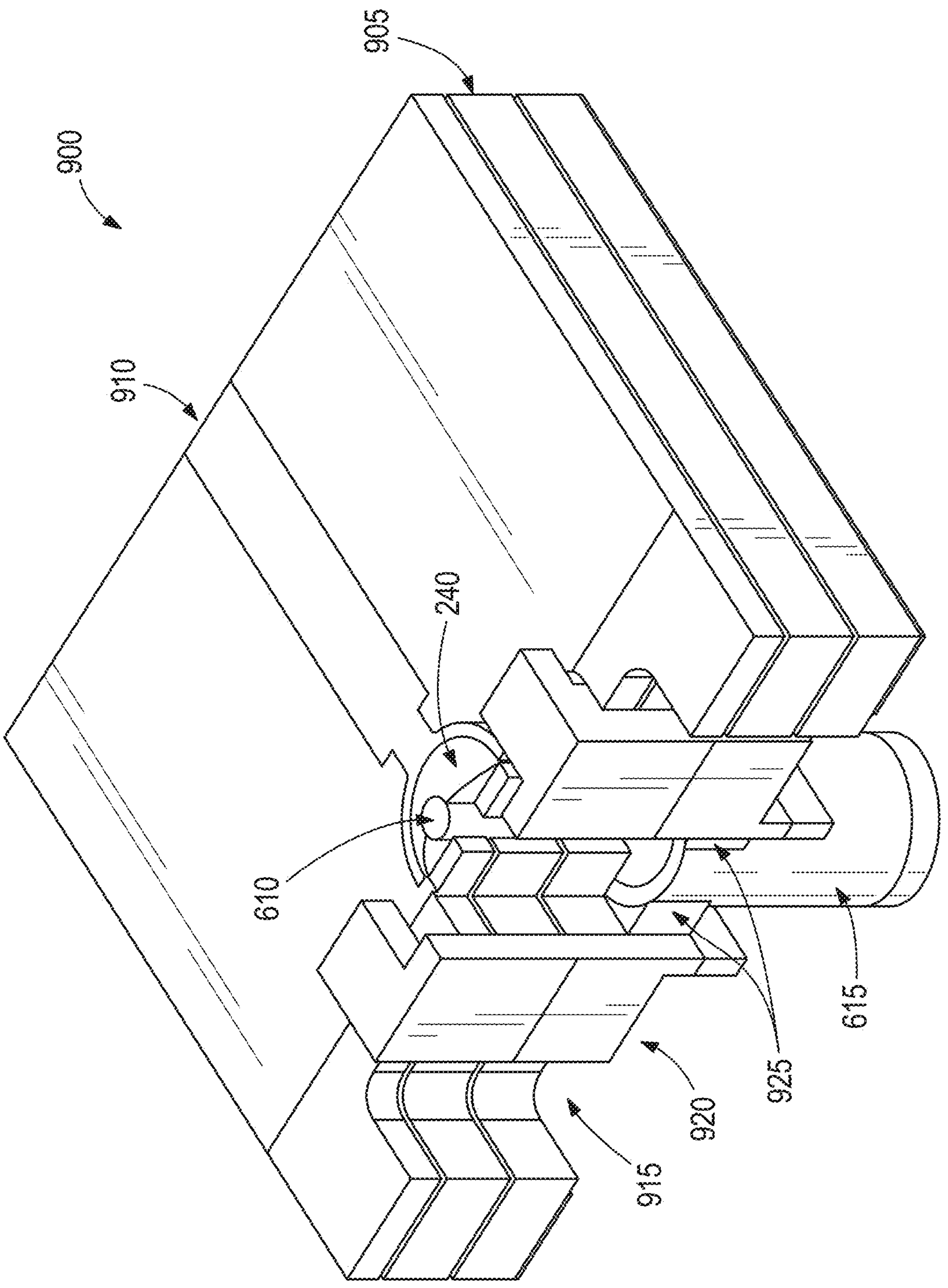
FIG. 9 illustrates a variation in which a clip and RF cable is installed on a multilayer PCB.

FIG. 9 illustrates a variation is which a vertical launch assembly 900 is implemented on a multilayer PCB 905. As illustrated vertical clip 920 is installed in an edge mount cutout 915 formed in multilayer PCB 905. As illustrated, an inner conductor 610 of an RF cable is electrically coupled to an RF trace 910 via a solder point 240, and an outer conductor 615 of the RF cable is mechanically and electrically coupled to clip 920 by solder Joint 925. The installation of the RF cable onto vertical clip 920 may be done in a similar manner to that described above with regard to vertical clip 220.

Figure 10:
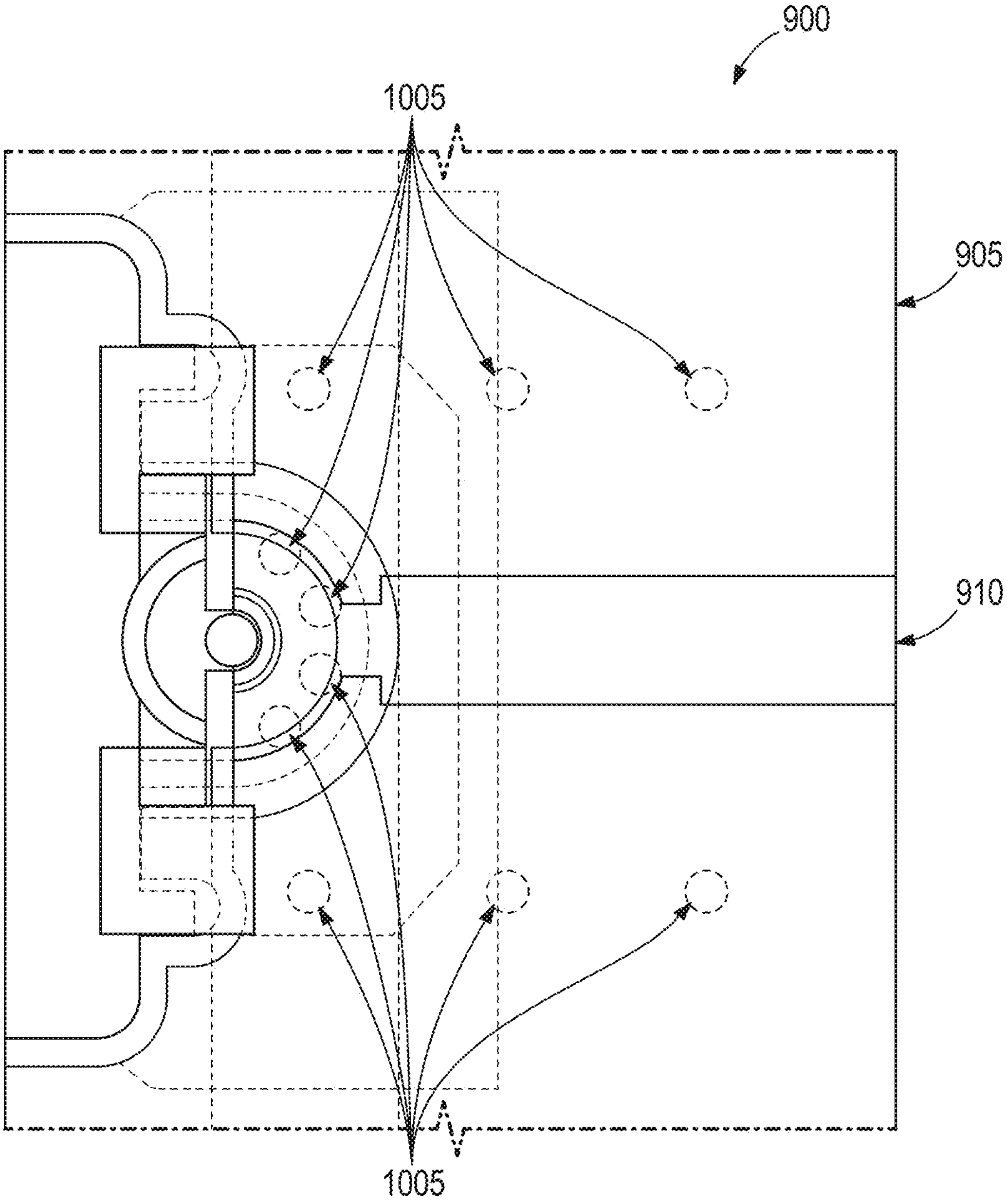
FIG. 10 illustrates a clip and RF cable installed on a multilayer PCB, in which the layers and components are illustrated as semitransparent to reveal exemplary inner structure.

FIG. 10 illustrates a clip 920 and RF cable installed on a multilayer PCB 905, in which the layers and components are illustrated as semitransparent to reveal exemplary inner structure. Given the change in dimensions of the vertical clip 920 required to be installed on a multilayer PCB 905, RF tuning may be required. Illustrated in FIG. 10 are a plurality of blind plated through holes 1005 that may be formed in the PCB according to the disclosure. The number and placement of the additional blind plated through holes 1005 may be configured to tune the impedance of the RF connections at vertical launch clip 920 while maintaining a good VSWR (Voltage Standing Wave Ratio) at higher frequencies, Such as 6 GHz.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. An antenna having one or more PCBs (Printed Circuit Boards), each of the one or more PCBs comprising:

a plurality of cutouts formed in the PCB, each of the plurality of cutouts having a pair of interlocking slots, an inner conductor recess, and a solder pad disposed proximate to the inner conductor recess on a first side of the PCB, wherein the solder pad is electrically coupled to an RF trace disposed on the PCB;

a plurality of vertical clips, each corresponding to one of the plurality of cutouts, wherein each vertical clip is installed on an interior edge of its corresponding cutout, the vertical clip having a clip body, a cylindrical outer conductor receptacle, and a pair of mounting tabs, wherein the pair of mounting tabs engage with the pair of interlocking slots; and a plurality of RF cables extending perpendicularly from a second side of the PCB that is opposite of the first side, each of the plurality of RF cables mechanically coupled to a corresponding vertical clip and corresponding cutout, wherein each RF cable has an inner conductor that is soldered to a corresponding solder pad, and each RF cable has an outer conductor that is soldered to a corresponding cylindrical outer receptacle.

2. The antenna of claim 1, wherein the plurality of cutouts comprises:

a first subset having one or more interior cutouts; and a second subset having one or more edge mount cutouts.

3. The antenna of claim 1, wherein the PCB comprises a multilayer PCB.

4. The antenna of claim 3, wherein the PCB comprises a plurality of blind plated through holes, wherein the placement and number of the blind plated through holes is configured to maintain VSWR (Voltage Standing Wave Ratio) at a high frequency.

5. A method for installing a vertical RF launch on an antenna PCB (Printed Circuit Board), the PCB having a plurality of cutouts, each cutout having an inner conductor recess, the method comprising:

attaching a vertical clip onto an interior edge of each of the plurality of cutouts;

inserting an RF cable into each of the plurality of vertical clips from a first side of the PCB, wherein the inserting includes inserting an inner conductor of the RF cable through a corresponding inner conductor recess, and inserting an outer conductor of the RF cable into a cylindrical outer receptacle of the corresponding vertical clip;

soldering, from a second side of the PCB, each inner conductor to a corresponding solder pad formed on the second side of the PCB; and soldering, from the second side of the PCB, each outer conductor to the corresponding cylindrical outer receptacle.

* * * * *